(12) United States Patent
Borwick et al.

(10) Patent No.: US 8,654,332 B2
(45) Date of Patent: Feb. 18, 2014

(54) CHIP-SCALE OPTICS MODULE FOR OPTICAL INTERROGATORS

(75) Inventors: Robert L. Borwick, Thousand Oaks, CA (US); Jeffrey F DeNatale, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 231 days.

(21) Appl. No.: 13/166,746

(22) Filed: Jun. 22, 2011

(65) Prior Publication Data

US 2012/0327413 A1 Dec. 27, 2012

(51) Int. Cl.
*G01J 4/00* (2006.01)

(52) U.S. Cl.
USPC ......................................................... 356/364

(58) Field of Classification Search
USPC ............................. 356/364, 370; 250/559.09
See application file for complete search history.

(56) References Cited

U.S. PATENT DOCUMENTS

| | | | |
|---|---|---|---|
| 6,265,945 B1 * | 7/2001 | Delaney et al. ................... 331/3 |
| 6,900,702 B2 * | 5/2005 | Youngner et al. ............ 331/94.1 |
| 7,359,059 B2 * | 4/2008 | Lust et al. ...................... 356/459 |
| 7,619,485 B2 * | 11/2009 | DeNatale et al. ............ 331/94.1 |
| 7,630,075 B2 * | 12/2009 | Fritz .............................. 356/337 |
| 7,786,808 B2 * | 8/2010 | DeNatale .......................... 331/3 |
| 7,956,697 B2 * | 6/2011 | Aoyama et al. .............. 331/94.1 |
| 8,031,401 B2 * | 10/2011 | Oto ........................... 359/489.07 |
| 2006/0055909 A1 * | 3/2006 | Fiolka et al. .................... 355/71 |
| 2007/0058252 A1 * | 3/2007 | Fritz .............................. 359/486 |
| 2010/0245998 A1 * | 9/2010 | Walworth et al. ............. 359/465 |

\* cited by examiner

*Primary Examiner* — Roy M Punnoose
(74) *Attorney, Agent, or Firm* — Brooks Acordia IP Law, P.C.

(57) ABSTRACT

A method is disclosed for manufacturing a chip-scale optics module for an optical interrogator. The method includes aligning a polarization axis of a linear polarizer to an angle of 45 degrees from a fast axis of a quarter wave plate to enable circular polarization of a beam, when a beam is introduced to the linear polarizer, coupling the linear polarizer to the quarter wave plate after the aligning to form a circular polarizing filter sheet and then dicing the circular polarizing filter sheet to obtain a plurality of chip-scale circular polarizing filters. Each of the chip-scale circular polarizing filters is diced to have an edge that defines a polarization location index for the linear polarizer. A linear polarizer plate face of one of the chip-scale circular polarizing filters is then positioned so that the linear polarizer plate face is aligned with and parallel to an output face of a laser, whereby the polarization axis of the linear polarizer is not orthogonal to a polarization axis of the laser. The chip-scale circular polarizing filter is coupled to a frame after the positioning step.

18 Claims, 4 Drawing Sheets

CHIP-SCALE OPTICS MODULE FOR OPTICAL INTERROGATORS

STATEMENT REGARDING FEDERALLY SPONSORED RESEARCH OR DEVELOPMENT

This invention was made with Government support and promoted by the US Navy, SPAWAR Systems Center under contract number N66001-02-C-8025 and the US Army Communications Electronics Command (CECOM) under contract number W15P7T-08-C-P216 issued to Teledyne Scientific & Imaging, LLC. The Government has certain rights in the invention.

BACKGROUND OF THE INVENTION

1. Field of the Invention

This invention relates to optical components, and more particularly to circular polarizing filters.

2. Description of the Related Art

Optics systems used for precision imaging, measurement, analysis may employ circular polarizing filters to obtain a beam of circularly polarized light. A quarter wave plate may be placed after a linear polarizer to obtain such a circular polarizer, with a fast axis of the quarter wave plate aligned at a 45 degree angle from the polarizing axis of the linear polarizer to obtain accurate circular polarization.

As a practical matter, alignment of the fast axis of the quarter wave plate to the polarization axis of the linear polarizer is frustrated as the components become too small to physically handle and measure. Chip-scale optics modules that employ circular polarizing filters may require exact alignment of the relevant axes to properly interrogate a sample vapor in a chip-scale atomic clock, for example. The circular polarizing filter may then need subsequent alignment with a laser. Alignment tolerances for the quarter wave plate to the linear polarizer, and subsequent alignment of the components to a laser are frustrated by the difficulty associated with physically handling the very small components.

A need still exists to accurately align the fast axis of the quarter wave plate at a 45 degree angle from the polarizing axis of the linear polarizer for assembly into chip-scale optics systems without time-consuming placement and alignment of such small components.

SUMMARY OF THE INVENTION

A method is disclosed that includes aligning a polarization axis of a linear polarizer to an angle of 45 degrees from a fast axis of a quarter wave plate to enable circular polarization of a beam, when a beam is introduced to the linear polarizer. The linear polarizer is coupled to the quarter wave plate after the aligning to form a circular polarizing filter sheet, the circular polarizing filter sheet is diced to obtain a plurality of chip-scale circular polarizing filters, each of the chip-scale circular polarizing filters having an edge to define a polarization location index for the linear polarizer, and positioning a linear polarizer plate face of one of the chip-scale circular polarizing filters so that the linear polarizer plate face is aligned with and parallel to an output face of a laser, whereby the polarization axis of the linear polarizer is not orthogonal to a polarization axis of the laser, and coupling the chip-scale circular polarizing filter to a frame after the positioning step.

An apparatus is also disclosed that includes a frame, a chip-scale circular polarizing filter coupled to the frame, the chip-scale circular polarizing filter comprising a quarter wave plate coupled to a linear polarizer; and a laser coupled to the frame, an output side of the laser facing the linear polarizer.

A further apparatus is disclosed that includes a vapor interrogation chamber for encapsulating a concentration of gaseous atom species, a vertical cavity surface emitting laser ("VCSEL") positioned to output a beam through the gas interrogation chamber, and a chip-scale circular polarizing filter positioned between the gas interrogation chamber and the VCSEL, the chip-scale circular polarizing filter comprising a quarter wave plate coupled to a linear polarizer, a fast axis of the quarter wave plate positioned approximately 45 degrees to a polarization axis of the linear polarizer.

BRIEF DESCRIPTION OF THE DRAWINGS

The components in the figures are not necessarily to scale, emphasis instead being placed upon illustrating the principals of the invention. Like reference numerals designate corresponding parts throughout the different views.

DETAILED DESCRIPTION OF THE PREFERRED EMBODIMENTS

Figure 1:
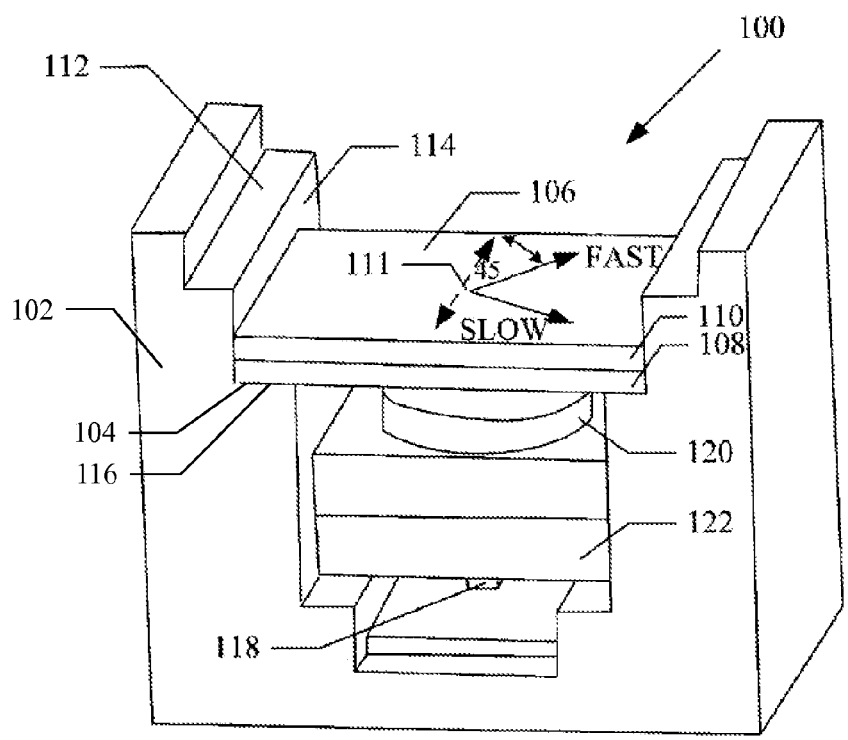
FIG. 1 is a perspective view of a chip-scale optics module for an optical interrogator in accordance with one embodiment of the invention.

FIG. 1 is a perspective view of a chip-scale optics module 100 that has a linear polarizer indexer for receiving a polarization location index on a chip-scale circular polarizing filter to facilitate alignment of a laser with the polarizing filter. The optics module 100 has frame 102 that has a polarizing filter shelf 104 to seat a chip-scale circular polarizing filter 106. The chip-scale circularizing filter is a linear polarizer 108 coupled to a quarter wave plate 110, with the filter having an edge 112 that is a polarization location index for the linear polarizer 108. The polarization location index 112 is preferably an edge of the linear polarizer 108 that is aligned with a crystal plane of the linear polarizer, if the linear polarizer 108 has a crystal plane, or otherwise aligned to the polarization axis 111 of the linear polarizer 108 to quickly and easily locate the polarization axis 111 of the linear polarizer. Or, the polarization location index 112 may be formed at a predetermined angle from the polarization axis of the linear polarizer 108. The frame 102 has a linear polarizer indexer 114 guide, preferably a wall extending vertically from the polarizing filter shelf 104, to receive the polarization location index 112 of the linear polarizer 108. A linear polarizer plate face 116 of the chip-scale circular polarizing filter 106 is aligned with and perpendicular to an output face of a laser 118 as the polarizing filter 106 is seated on the polarizing filter shelf 104. In one embodiment, the polarization axis 111 of the linear polarizer 108 is parallel to a polarization axis (not shown) of the laser 118. Or, the polarization axis 111 may be oriented away from parallel with the polarization axis of the laser so that if the polarization orientation of the laser flips 90 degrees, throughput of the laser beam introduced through the chip-scale circular polarizing filter 106 is maintained. In such a case, one preferred rotation of the polarization axis of the linear polarizer is 45 degrees from the polarizing axis of the laser 118.

Figure 2:
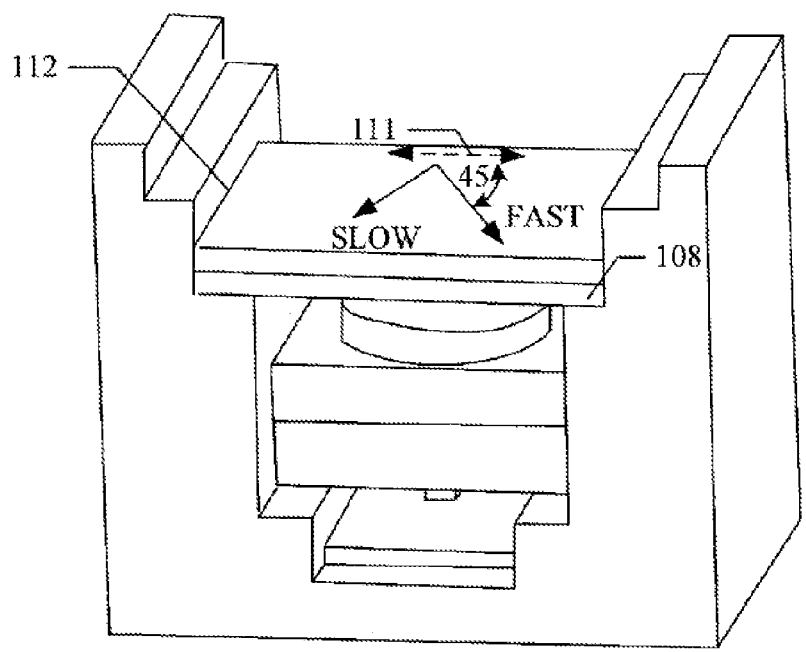
FIG. 2 is a perspective view of another embodiment of a chip-scale optics module for an optical interrogator.

A collimating lens 120 is preferably positioned in-line with the chip-scale circular polarizing filter 106 and positioned between the laser 118 and the circular polarizing filter. In one embodiment, the laser is a vertical cavity surface emitting laser ("VCSEL"). Or, the laser may be chosen according to the application for the chip-scale optics module. A neutral density filter 122 is preferably seated on the frame 102 and positioned between the laser 118 and collimating lens 120 to reduce or optimize the power presented through the chip-scale circular polarizing filter 106 for presentation to, for example, a vapor interrogation cell (not shown). In other embodiments, the neutral density filter 122 is positioned between the collimating lens 120 and the polarizing filter 106. Although the optics module 100 illustrated in FIG. 1 indicates the polarizing axis 111 of the linear polarizer 108 is parallel to the polarization location index 112, in other embodiments such as that illustrated in FIG. 2, the polarizing axis 111 of the linear polarizer 108 is perpendicular to the polarization location index 112.

Figure 3:
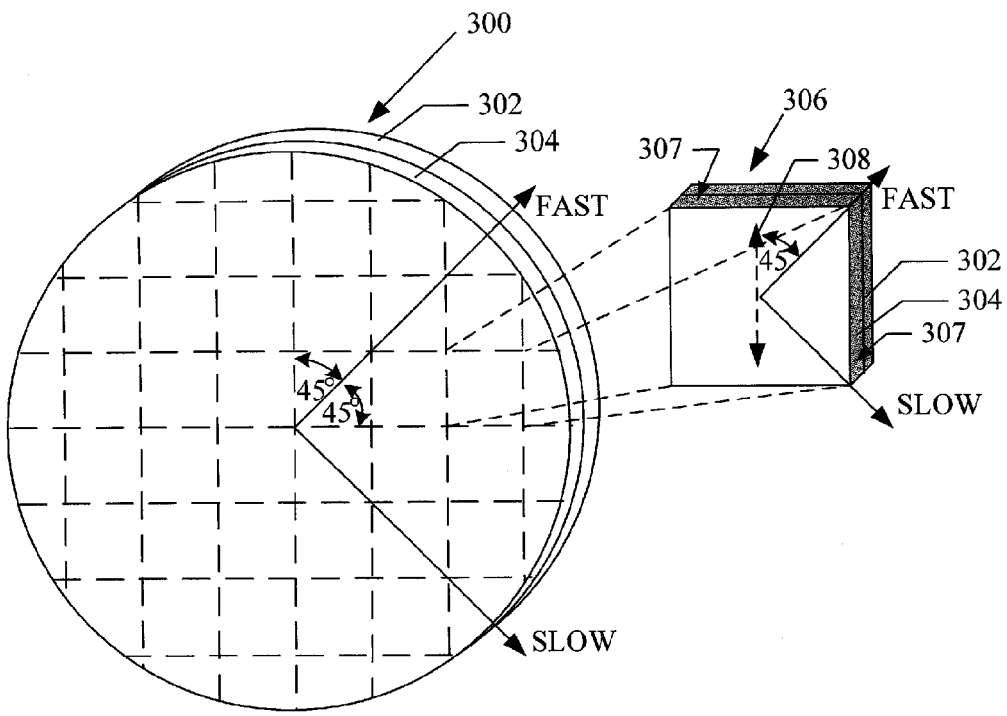
FIG. 3 is a perspective view of one embodiment of a circular polarizing filter sheet and illustrating dicing lines aligned with a polarization axis and Fast axis of a linear polarizer and quarter wave plate, respectively.

FIG. 3 is a perspective view of a circular polarizing filter sheet 300 that has dicing lines (indicated as dashed lines) aligned 45 degrees from the fast and slow axes of a quarter wave plate. A linear polarizer 302 is coupled to a quarter wave plate 304, with a polarization axis 308 of the linear polarizer 302 aligned with a fast axis of the quarter wave plate 304. The polarizers (302, 304) are bonded together preferably using optical epoxy, such as Master Bond Part No. EP30HT-LO offered by Master Bond Inc. of Hackensack, N.J. The linear polarizer 302 may be any polarizer suitable for the designed application. In one chip-scale circular polarizing filter 300 for use with a VCSEL that is a single mode, 795 nm wavelength at 80 degrees C. laser, the polarizer is preferably a single side coated polarizer having a thickness of 0.22 (+/−0.05) and color Pol IR 011 AC2,7 CSW02. In such an embodiment, the quarter wave plate 304 is preferably a true, zero order, ¼ wave plate at 795 nm thick and anti-reflection (AR) coated for −1% reflection at 795 nm, on one side only, as offered by Foctek Photonics, Inc. of Fuzhou, Fujian, China.

Figure 4:
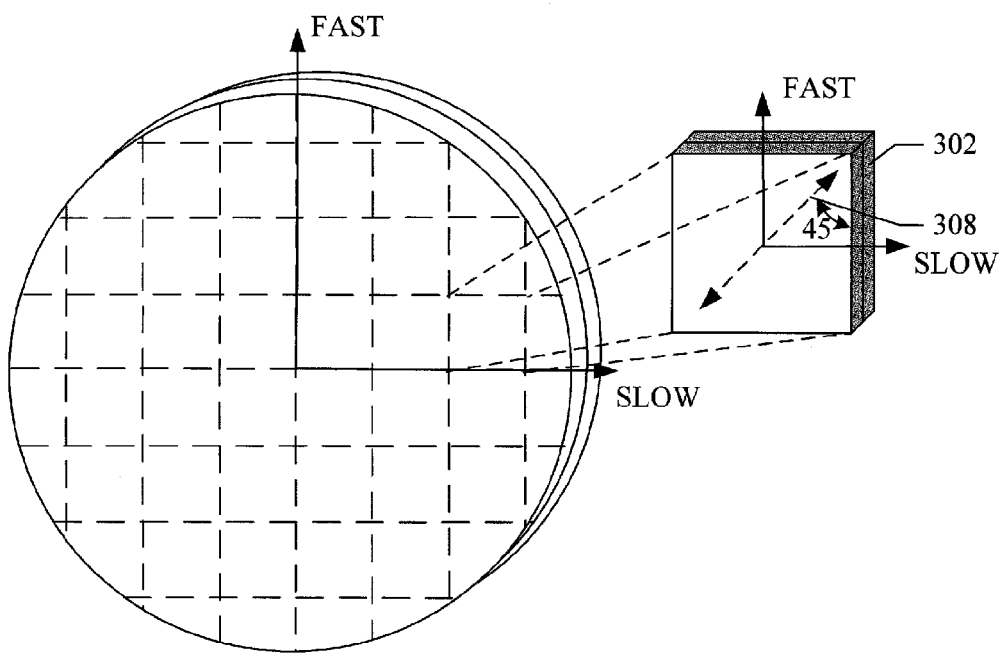
FIG. 4 is a perspective view of another embodiment of a circular polarizing filter sheet and illustrating dicing lines that are oriented 45 degrees from a polarization axis and Fast axis of a linear polarizer and quarter wave plate, respectively.

As illustrated in FIG. 3, dicing would result in individual chip-scale circular polarizing filters 306, each having an edge (in this embodiment at least two edges) 307 that define a polarization location index for the linear polarizer with the linear polarizer's polarization axis 308 to an angle of 45 degrees from the fast axis of the quarter wave plate 304. This illustrated embodiment may be used in the chip-scale optics module 100 illustrated in FIG. 1 as the polarization location index is parallel to the linear polarizer's polarization axis 308. In another embodiment of a chip-scale circular polarizing filter illustrated in FIG. 4, dice lines are illustrated as parallel and perpendicular to a fast axis of the quarter wave plate, with the dice lines oriented 45 degrees from the polarization axis 308 of the linear polarizer 302.

Figure 5:
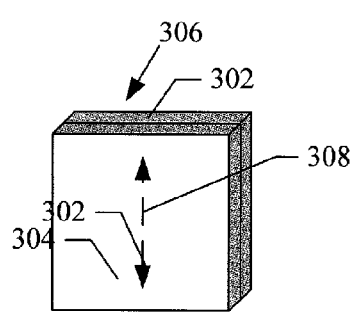
FIGS. 5-8 are perspective views of different embodiments of a circular polarizing filter, each having an edge to a define polarization location index for the included linear polarizer.
Figure 6:
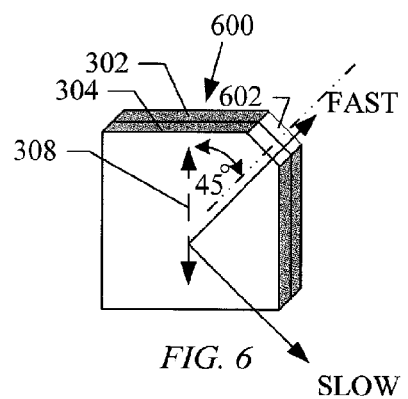
Figure 7:
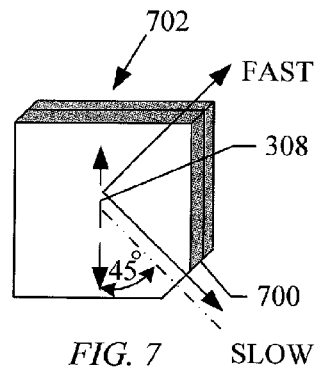
Figure 8:
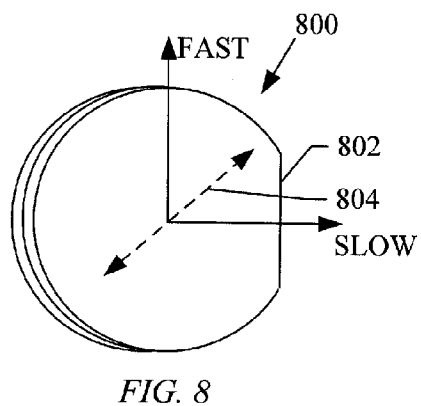

FIGS. 5-8 illustrate alternative embodiments of chip-scale circular polarizing filters that each have an edge to define their polarization location index. FIG. 5 illustrates the chip-scale circular polarizing filter first illustrated in FIG. 3, with one set of edges each parallel to the polarization axis 308 of the linear polarizer 302 of the chip-scale circular polarizing filter 306. In FIG. 6, the chip-scale circular polarizing filter 600 has been assembled and diced along dicing lines that are oriented parallel and perpendicular from the polarization axis 308 of the linear polarizer 302. A polarization location index 602 has been created at one corner of the polarizing filter 600 that is perpendicular to the fast axis of the quarter wave plate 304 to create an edge that oriented 45 degrees from a polarization axis 308 of the linear polarizer 302. In another embodiment illustrated in FIG. 7, a polarization location index 700 is created at a different corner of the chip-scale circular polarizing filter 702 along a line that is perpendicular to a slow axis of the quarter wave plate 304 and so 45 degrees from the polarization axis 308 of the linear polarizer 302. In a further embodiment illustrated in FIG. 8, the chip-scale circular polarizing filter is in the form of a circular filter 800 that has had a polarization location index edge 802 formed perpendicular to a slow axis of the quarter wave plate 804 to enable drop-in alignment of the polarizing filter in, for example, the frame 102 first illustrated in FIG. 1, at an angle that is 45 degrees from the polarization axis 804 of the circular filter 800.

Figure 9:
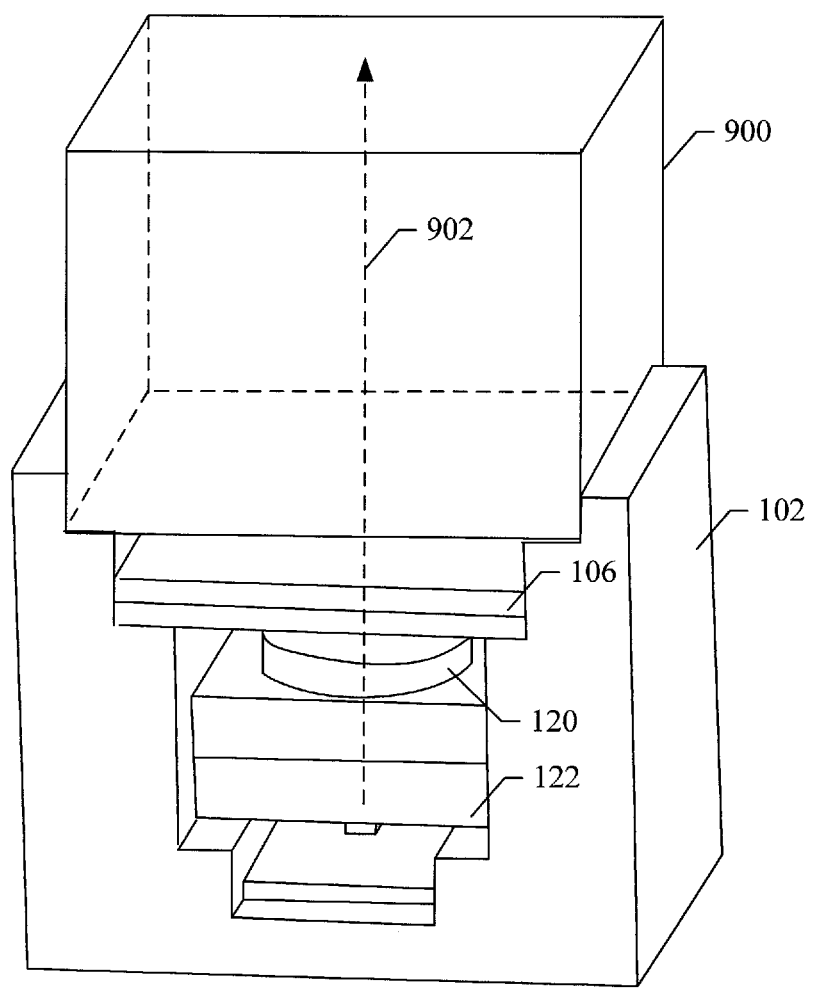
FIG. 9 is a perspective view of the chip-scale optics module illustrated in FIG. 1 and having an optical interrogator.

FIG. 9 illustrates one possible application for the chip-scale optics module illustrated in FIG. 1. In one embodiment, an alkali material vapor cell 900 is seated on the frame 102 for receipt of a laser beam provided by a VCSEL (795 nm). The beam 902 is attenuated by the neutral density filter 122 and collimated by the collimating lens 120 before being circularly polarized by the chip-scale circular polarizing filter 106. In alternative embodiments, the system of FIG. 9 may use one of the chip-scale circular polarizing filters illustrated in FIGS. 6-8 to, for example, either rotate the polarizing axis of the linear polarizer away from the polarizing axis of the VCSEL axis to reduce or eliminate the need for the neutral density filter 122 or to optimize the optical power for use by the vapor cell 900. In one embodiment, the chip-scale circular polarizing filter of FIG. 6 is used to orient the polarization axis of the linear polarizer 45 degrees from the polarizing axis of the VCSEL laser to eliminate failures sometimes seen by polarization axis flipping of some VCSEL lasers. In such an embodiment, the concomitant attenuation of optical power created by the 45 degree orientation of the linear polarizer with respect to the VCSEL laser polarization axis serves to reduce the neutral density filter requirements otherwise necessary to suitably reduce the optical power required for the vapor cell 900.

While various implementations of the application have been described, it will be apparent to those of ordinary skill in the art that many more embodiments and implementations are possible that are within the scope of this invention.

We claim:

1. A method of manufacturing a chip-scale optics module for an optical interrogator, comprising:

aligning a polarization axis of a linear polarizer to an angle of 45 degrees from a fast axis of a quarter wave plate to enable circular polarization of a beam, when a beam is introduced to said linear polarizer;

coupling said linear polarizer to said quarter wave plate after said aligning to form a circular polarizing filter sheet;

dicing said circular polarizing filter sheet to obtain a plurality of chip-scale circular polarizing filters, each of said chip-scale circular polarizing filters having an edge to define a polarization location index for said linear polarizer;

positioning a linear polarizer plate face of one of said chip-scale circular polarizing filters so that said linear polarizer plate face is aligned with and parallel to an output face of a laser, whereby the polarization axis of said linear polarizer is not orthogonal to a polarization axis of said laser; and coupling said chip-scale circular polarizing filter to a frame after said positioning step.

2. The method of claim 1, further comprising:
coupling said laser to said frame.

3. The method of claim 1, wherein said positioning step further comprises:
positioning the polarization axis of said linear polarizer to a position rotated 45 degrees from the polarization axis of said laser so that if polarization of said laser flips 90 degrees, throughput of a laser beam introduced through said circular polarizing filter is maintained.

4. The method of claim 1, wherein said positioning step further comprises:
positioning the polarization axis of said linear polarizer to attenuate a laser beam emitted from said laser to match input requirements of a vapor interrogation cell aligned with said beam.

5. The method of claim 1, wherein said dicing said circular polarizing filter sheet further comprises dicing said circular polarizing filter into rectangular or square chip-scale circular polarizing filter shapes.

6. The method of claim 1, further comprising:
positioning a neutral density filter in-line with said chip-scale circular polarizing filter and said laser onto said frame; and
positioning a collimating lens in-line with each of said chip-scale circular polarizing filter, said laser and said neutral density filter, whereby a beam emitted by said laser passes through said neutral density filter, said collimating lens and said chip-scale circular polarizing filter.

7. An apparatus, comprising:
a frame;
a chip-scale circular polarizing filter coupled to said frame, said chip-scale circular polarizing filter comprising a quarter wave plate coupled to a linear polarizer; and
a laser coupled to said frame, an output side of said laser facing said linear polarizer.

8. The apparatus of claim 7, wherein said linear polarizer has at least one edge aligned with a polarization axis of said linear polarizer to facilitate alignment with said laser.

9. The apparatus of claim 8, wherein said frame comprises:
a polarizing filter shelf to seat said chip-scale circular polarizing filter; and
a linear polarizer indexer to guide said at least one edge so that a polarization axis of said linear polarizer is parallel with the polarization axis of said laser.

10. The apparatus of claim 7, wherein said linear polarizer indexer is a planar guide extending from said circular polarizing filter shelf to receive said at least one edge of said linear polarizer.

11. The apparatus of claim 7, wherein said frame comprises:
a polarizing filter shelf to seat said chip-scale circular polarizing filter, said polarizing filter shelf having a planar guide extending perpendicular to a polarization axis of said linear polarizer.

12. The apparatus of claim 7, further comprising:
a collimating lens positioned in-line with said chip-scale circular polarizing filter and positioned between said laser and said circular polarizing filter.

13. The apparatus of claim 7, wherein said laser is a vertical cavity surface emitting laser ("VCSEL").

14. The apparatus of claim of claim 7, wherein said chip-scale circular polarizing filter is rotatably positioned in said frame to attenuate the power transmitted from said laser through said circular polarizing filter to interrogate a vapor cell positioned in-line with said laser.

15. The apparatus of claim 7, wherein said chip-scale circular polarizing filter is rotatably positioned in said frame to attenuate the power transmitted from said laser and through said chip-scale circular polarizing filter to match input requirements of a vapor interrogation cell aligned with said beam to interrogate the vapor cell.

16. A system, comprising:
a vapor interrogation chamber for encapsulating a concentration of gaseous atom species;
a vertical cavity surface emitting laser ("VCSEL") positioned to output a beam through said gas interrogation chamber; and
a chip-scale circular polarizing filter positioned between said gas interrogation chamber and said VCSEL, said chip-scale circular polarizing filter comprising a quarter wave plate coupled to a linear polarizer, a fast axis of said quarter wave plate positioned approximately 45 degrees to a polarization axis of said linear polarizer.

17. The system of claim 16, wherein said polarizer has a polarization axis positioned 45-degrees from a polarization axis of said VCSEL.

18. The system of claim 16, further comprising:
a frame coupled to said VCSEL, wherein said chip-scale circular polarizing filter is rotatably positioned in said frame to reduce the power transmitted from said laser and through said chip-scale circular polarizing filter to interrogate a vapor cell positioned in-line with said laser.

* * * * *

UNITED STATES PATENT AND TRADEMARK OFFICE
CERTIFICATE OF CORRECTION

PATENT NO. : 8,654,332 B2  Page 1 of 1
APPLICATION NO. : 13/166746
DATED : February 18, 2014
INVENTOR(S) : Robert L. Borwick and Jeffrey F. DeNatale It is certified that error appears in the above-identified patent and that said Letters Patent is hereby corrected as shown below:

In the Drawings

Fig. 5

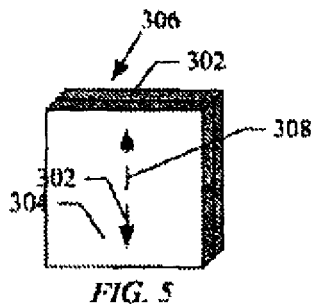

should be

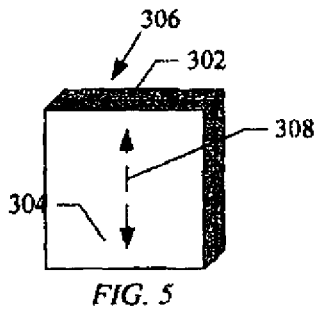

Signed and Sealed this
Sixteenth Day of September, 2014

Michelle K. Lee
*Deputy Director of the United States Patent and Trademark Office*